(12) United States Patent
Ferens et al.

(10) Patent No.: US 10,008,010 B2
(45) Date of Patent: Jun. 26, 2018

(54) TECHNIQUES FOR PROVIDING AN AUGMENTED REALITY VIEW

(71) Applicant: INTEL CORPORATION, Santa Clara, CA (US)

(72) Inventors: Ron Ferens, Ramat Hasharon (IL); Gila Kamhi, Zichron Yaakov (IL); Barak Hurwitz, Kibbutz Alonim (IL); Amit Moran, Tel Aviv (IL); Dror Reif, Be'er-Yacoov (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/129,930

(22) PCT Filed: Sep. 12, 2013

(86) PCT No.: PCT/US2013/059444
§ 371 (c)(1),
(2) Date: Aug. 7, 2014

(87) PCT Pub. No.: WO2015/038127
PCT Pub. Date: Mar. 19, 2015

(65) Prior Publication Data
US 2015/0070386 A1 Mar. 12, 2015

(51) Int. Cl.
*G06T 19/00* (2011.01)
*G06T 11/00* (2006.01)
(Continued)

(52) U.S. Cl.
CPC .............. *G06T 11/00* (2013.01); *G02B 27/01* (2013.01); *G06F 3/011* (2013.01);
(Continued)

(58) Field of Classification Search
CPC .................. G06T 19/006; G06T 7/004; G06T 2207/30244; G02B 2027/0138
(Continued)

(56) References Cited

U.S. PATENT DOCUMENTS

2004/0196433 A1  10/2004  Durnell
2006/0250322 A1  11/2006  Hall et al.
(Continued)

OTHER PUBLICATIONS

International Preliminary Report on Patentability received for PCT Patent Application No. PCT/US2013/059444, dated Mar. 24, 2016, 7 pages.

*Primary Examiner* — Samantha (Yuehan) Wang

(57) ABSTRACT

Various embodiments are generally directed to techniques for providing an augmented reality view in which eye movements are employed to identify items of possible interest for which indicators are visually presented in the augmented reality view. An apparatus to present an augmented reality view includes a processor component; a presentation component for execution by the processor component to visually present images captured by a camera on a display, and to visually present an indicator identifying an item of possible interest in the captured images on the display overlying the visual presentation of the captured images; and a correlation component for execution by the processor component to track eye movement to determine a portion of the display gazed at by an eye, and to correlate the portion of the display to the item of possible interest. Other embodiments are described and claimed.

20 Claims, 11 Drawing Sheets

(51) Int. Cl.
*G06F 3/01* (2006.01)
*G02B 27/01* (2006.01)

(52) U.S. Cl.
CPC ............... *G02B 2027/014* (2013.01); *G02B 2027/0138* (2013.01); *G02B 2027/0187* (2013.01)

(58) Field of Classification Search
USPC ........................................ 345/633
See application file for complete search history.

(56) References Cited

U.S. PATENT DOCUMENTS

| | | | |
|---|---|---|---|
| 2007/0058836 A1* | 3/2007 | Boregowda | G06K 9/00771 382/103 |
| 2007/0273583 A1* | 11/2007 | Rosenberg | H04W 8/005 342/367 |
| 2011/0043644 A1 | 2/2011 | Munger et al. | |
| 2011/0081043 A1* | 4/2011 | Sabol | G06T 7/254 382/103 |
| 2011/0221656 A1 | 9/2011 | Haddick et al. | |
| 2011/0292076 A1* | 12/2011 | Wither | G06F 17/30265 345/632 |
| 2012/0135784 A1 | 5/2012 | Lee et al. | |
| 2012/0154619 A1 | 6/2012 | Lee | |
| 2013/0021373 A1 | 1/2013 | Vaught et al. | |
| 2013/0054377 A1 | 2/2013 | Krahnstoever et al. | |
| 2014/0168056 A1* | 6/2014 | Swaminathan | G06K 9/00604 345/156 |

* cited by examiner

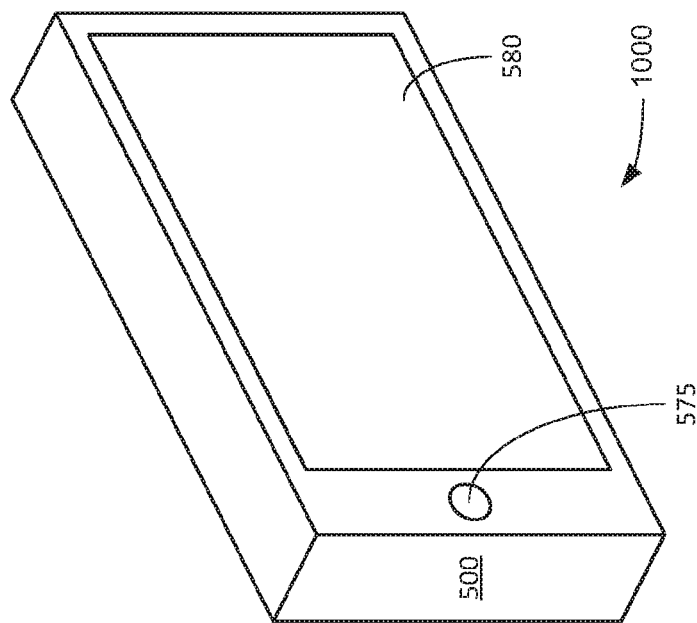
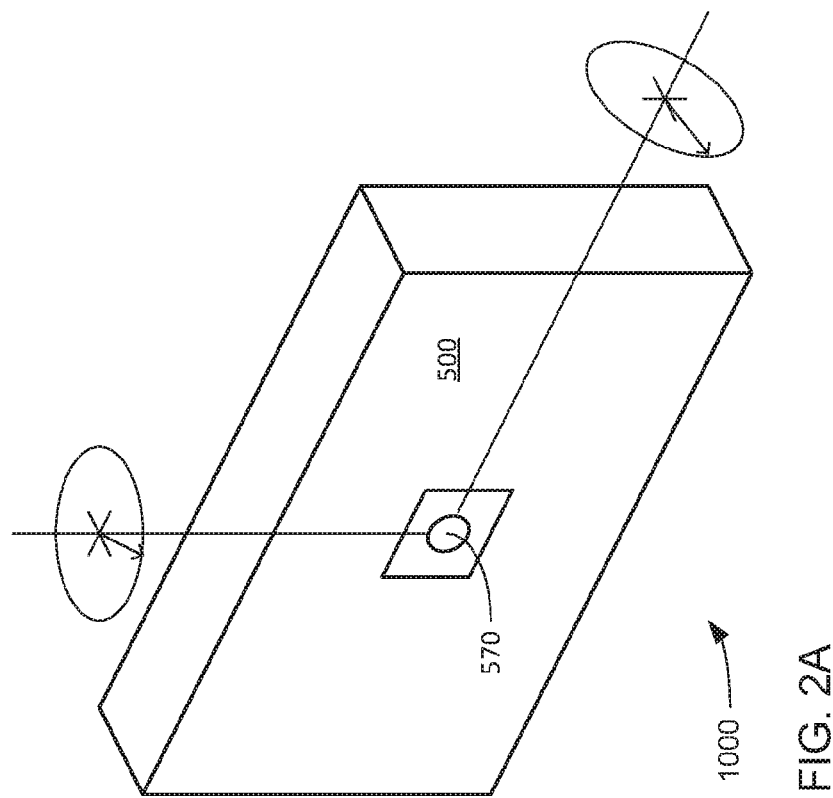

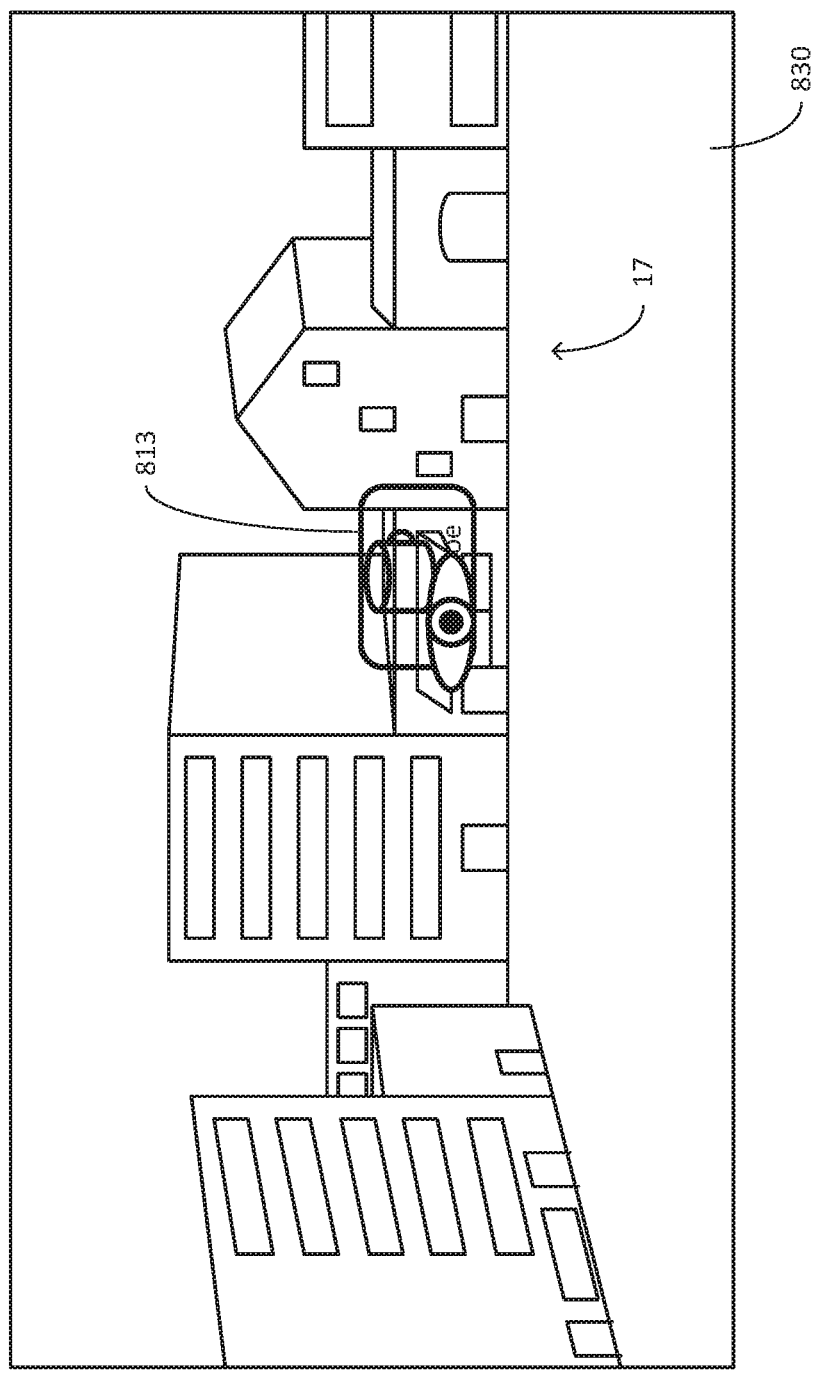

TECHNIQUES FOR PROVIDING AN AUGMENTED REALITY VIEW

TECHNICAL FIELD

Embodiments described herein generally relate to providing an augmented reality view of surroundings of a current location based on tracking eye movements to distinguish items of possible interest from other items in the augmented reality view.

BACKGROUND

The use of viewing devices equipped with location detectors, a camera and a display to provide an augmented reality view of surroundings is gaining in acceptance. Such a viewing device employs various location detection techniques (e.g., global positioning system satellite signals, a magnetic compass, etc.) to determine its current location and the current orientation of its camera relative to the surface of the Earth, and to request information concerning items in its immediate surroundings. Such a device then visually presents a view of the surroundings as captured by its camera in which that view is overlain with indicators that identify items in the view, thereby creating an augmented reality view.

In essence, such a viewing device becomes a "virtual window pane" through which an operator views his or her surroundings in a manner that enables items to be located and identified more quickly using the indicators of those items that are added to the view of those surroundings. By way of example, such a viewing device may be employed to find such items as restaurants, restrooms, hotel accommodations, tourist attractions, etc.

Unfortunately, current viewing devices providing such augmented reality views do not take into account what items are likely of interest to an operator at any given time. As a result, such viewing devices tend to provide an augmented reality view filled with too many indicators of items in the immediate surroundings. To an operator, this reduces the utility of the augmented reality view by essentially "cluttering" the view with so many indicators of items that are not of interest that the operator is hard pressed to pick out the indicators of items that are of interest and is hard pressed to actually see much of the surroundings in the augmented reality view.

BRIEF DESCRIPTION OF THE DRAWINGS

FIGS. 2A and 2B illustrate perspective views of a viewing device according to an embodiment.

FIG. 5 illustrates a visual presentation of an augmented reality view according to another embodiment.

DETAILED DESCRIPTION

Figure 1:
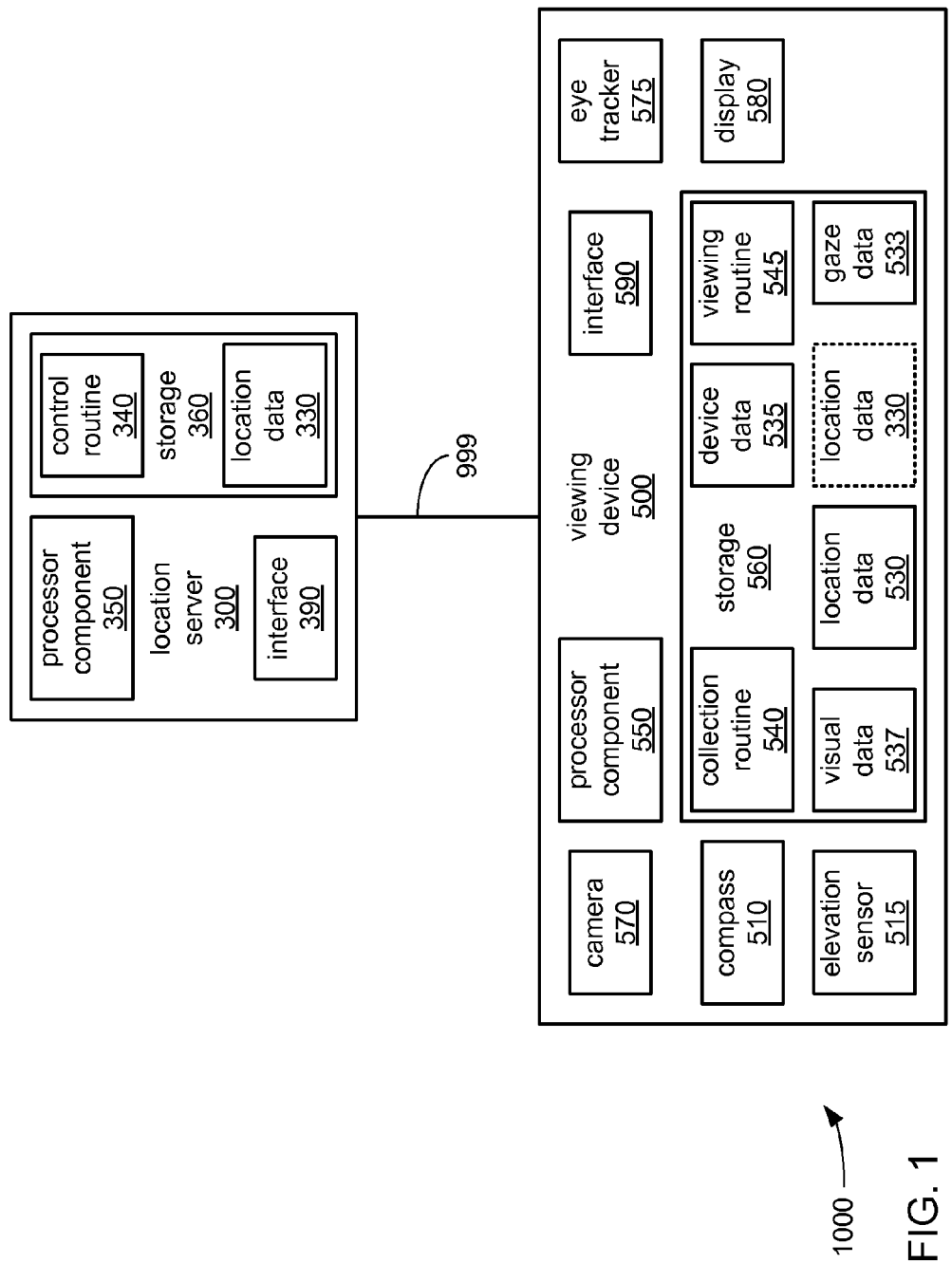
FIG. 1 illustrates an embodiment of an augmented reality viewing system.

Various embodiments are generally directed to techniques for providing an augmented reality view in which eye movements are employed to identify items of possible interest for which indicators are visually presented in the augmented reality view. Various location detection techniques are employed to determine the current location of a viewing device and the current orientation of its camera relative to that location, and to retrieve information identifying items located in the surroundings in the vicinity of the current location. As an operator looks at a display of the viewing device to view the surroundings through the camera and the display, an eye tracker of the viewing device determines where on the display the operator is looking to enable a determination of what items in the surroundings may be of interest. Visual indicators of those identified items of possible interest are then visually presented on the display in a manner that overlies the images captured by the camera.

The location detection techniques may include one or more of global positioning system (GPS) satellite signal reception, detection of direction and/or distance of wireless access points (APs), a magnetic compass to detect the direction of Earth's magnetic field, an accelerometer to detect the direction of the force of gravity, etc. The detection of orientation of the camera may include detection of the angle of elevation of the camera in addition to detecting its horizontal orientation (e.g., its compass heading of its horizontal orientation).

In retrieving information concerning items located in the surroundings of (in the vicinity of) the current location, the viewing device may transmit its current location to a server, but not its orientation, and receive information concerning items located throughout a full circular range of directions from the current location. A subset of those items may initially be selected for possible visual presentation based on which ones are in the field of view of the camera, given the current orientation of the camera relative to the current location. Alternatively, the viewing device may additionally transmit the current orientation of its camera and/or an indication of the angular width of the camera's field of view to the server to enable the server to limit the information concerning items that it transmits to the viewing device to only items in the surroundings that are also within the field of view of the camera.

Regardless of the exact manner in which items are initially selected for possible visual presentation of indicators based on the field of view of the camera, the selection of items is then further limited based on the eye movements of an operator of the viewing device. Eye movements of an operator are tracked over time to determine what portion of the display the operator gazes at more than other portions, and that determination of what portion of the display is gazed at is used to identify which item(s) in the surroundings in the field of view of the camera may be of interest to the operator.

Upon identification of items of possible interest to the operator in the field of view of the camera, indicators of those items are visually presented on the display in a manner that overlies the visual presentation of the field of view of the camera. Such indicators may include text and/or graphical indicators that identify those items to the operator (e.g., names and/or logos of businesses, identification of services offered, street addresses, etc.). A threshold minimum amount of time for an operator to gaze at a portion of the display may be used as a trigger to commence the visual presentation of one or more indicators of items of possible interest to ensure that such indicators are not falsely triggered to be visually presented as a result of a glance. Alternatively or additionally, a delay in ceasing to visually present one or more indicators of objects of possible interest may be imposed to ensure that cessation of such visual presentations is not falsely triggered by a momentary glance away to some other portion of the display and/or to an object other than the display.

In some embodiments, the indicators of items of possible interest may be arranged on the display at locations adjacent to (e.g., surrounding) the portion of the display at which the operator is determined to be gazing so as to not obscure the operator's view of the surroundings visible at that portion of the display. In other embodiments, one or more of the indicators of items of possible interest may be visually presented with some degree of transparency such that the operator is able to look through such indicators to continue gazing at that portion of the display without interruption. It should be noted operation of a viewing device, as described herein, could be indoors or outdoors. Thus, the scenery in the surroundings in the vicinity of the current location of the viewing device could be indoor scenery (e.g., building or house interiors, pieces of furniture, objects on shelves or tables, pieces of art or inventory in a storage area, etc.) or outdoor scenery (e.g., natural or man-made outdoor features, buildings or mountains, roads or rivers, geological features or monuments, etc.). Regardless of what the scenery in the surroundings is made up of, images of it are captured of it, and visually presented on with indicators of one or more items of possible interest in that scenery within the field of view of a camera.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of an augmented reality viewing system 1000 incorporating one or more of a location server 300 and a viewing device 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, subsets of these computing devices 300 and 500 exchange signals associated with determining a current location and orientation of a camera, and associated with providing information identifying items in the vicinity of the current location via a network 999. However, one or more of these computing devices may exchange other data entirely unrelated to locations or identifying items at locations with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the viewing device 500 incorporates one or more of a processor component 550, a storage 560, a compass 510, an elevation sensor 515, controls 520, a camera 570, an eye tracker 575, a display 580 and an interface 590 to couple the viewing device 500 to the network 999. The storage 560 stores one or more of a collection routine 540, a location data 530, a gaze data 533, a device data 535, a visual data 537, a viewing routine 545 and a location data 330. Each of the collection routine 540 and the viewing routine 545 incorporates a sequence of instructions operative on the processor component 550 in its role as a main processor component of the viewing device 500 to implement logic to perform various functions.

In executing the collection routine 540, the processor component 550 operates one or more of the interface 590, the compass 510 and the elevation sensor 515 to determine the current location of the viewing device 500 and the current orientation of the field of view of the camera 570 relative to current location, storing one or both as the location data 530. The processor component 550 may operate the interface 590 to receive wireless radio frequency signals transmitted by global positioning system (GPS) satellites orbiting the Earth to determine the current location. Alternatively or additionally, the processor component 550 may operate the interface 590 to receive wireless radio frequency signals of network access points (APs) of one or more networks (e.g., the network 999) to determine the current location. More specifically, the processor component 550 may operate the interface 590 to determine direction and/or distance of APs from the viewing device 500, as well as to receive identifying information from APs, and may request information of a server (e.g., the server 300) correlating identifying information of various APs with their location.

The processor component 550 may monitor the compass 510 to recurringly receive indications of the current orientation. Alternatively or additionally, the processor component 550 may monitor the elevation sensor 515 to recurringly receive indications of the elevation of the camera 570 relative to a horizontal plane at the current location (e.g., the angle at which the camera 570 may be aimed upwards or downwards from a horizontal plane). It is envisioned that the camera 570 is co-located in a common casing of the viewing device 500 with the compass 510 and/or the elevation sensor 515 such that an orientation of that casing necessarily links the orientation of the camera 570 to one or both of the compass 510 and the elevation sensor 515. The elevation sensor 515 may be based on any of a variety of technologies to detect an orientation relative to the direction of the force of gravity at the current location, including and not limited to, one or more accelerometers and/or a gyroscope. Such an accelerometer or gyroscope may be implemented with micro electro-mechanical systems (MEMS) technology.

In executing the collection routine 540, the processor component 550 also operates the camera 570 to recurringly capture images of scenery in the portion of the surroundings in the vicinity of the current location that falls within the field of view of the camera 570, given the current orientation of the camera 570. The processor component 550 recurringly stores the captured images as the visual data 537. Indications of the size of the field of view of the camera 570 may be stored as part of the device data 535. In some embodiments, the size of the field of view may be specified as one or more angular measurements of height and/or width of the field of degrees. In other embodiments, the height and/or width may be specified as linear measurements taken at a specified distance from the camera 570.

In executing the viewing routine 545, the processor component 550 recurringly retrieves the captures images of the visual data 537 and visually presents them on the display 580. In some embodiments, the viewing routine 545 may be a separate and distinct routine from the collection routine 540. In such embodiments, the viewing routine 545 may be one of multiple viewing routines available for use with the viewing device 500, and the collection routine 540 may be employed by one or more of those multiple viewing routines to support their execution through the provision of one or more of the pieces of information collected by the collection routine 540. More specifically, the collection routine 540 may be implemented as a set of executable components of a library configured to support the execution of any of a variety of viewing routines via function calls made to those components from within those viewing routines. In other embodiments, the collection routine 540 and the viewing routine 545 may be a single common routine.

FIGS. 2A and 2B depict perspective views of opposing sides of an example physical configuration of the viewing device 500 implemented as a "smart phone" or small "tablet computer" in which the display 580 makes up much of one side and the camera 570 is disposed on an opposite side. It should be noted that despite this depiction of a specific physical configuration of the viewing device 500, other embodiments are possible in which the viewing device 500 may take any of a variety of other physical forms. By way of example, another possible physical configuration is that of a pair of glasses in which one or more cameras 570 are oriented to face forward from the face of an operator wearing the glasses, and one or more displays 580 are positioned to visually present images captured by the camera(s) 570 to one or both eyes of the operator.

Figure 3:
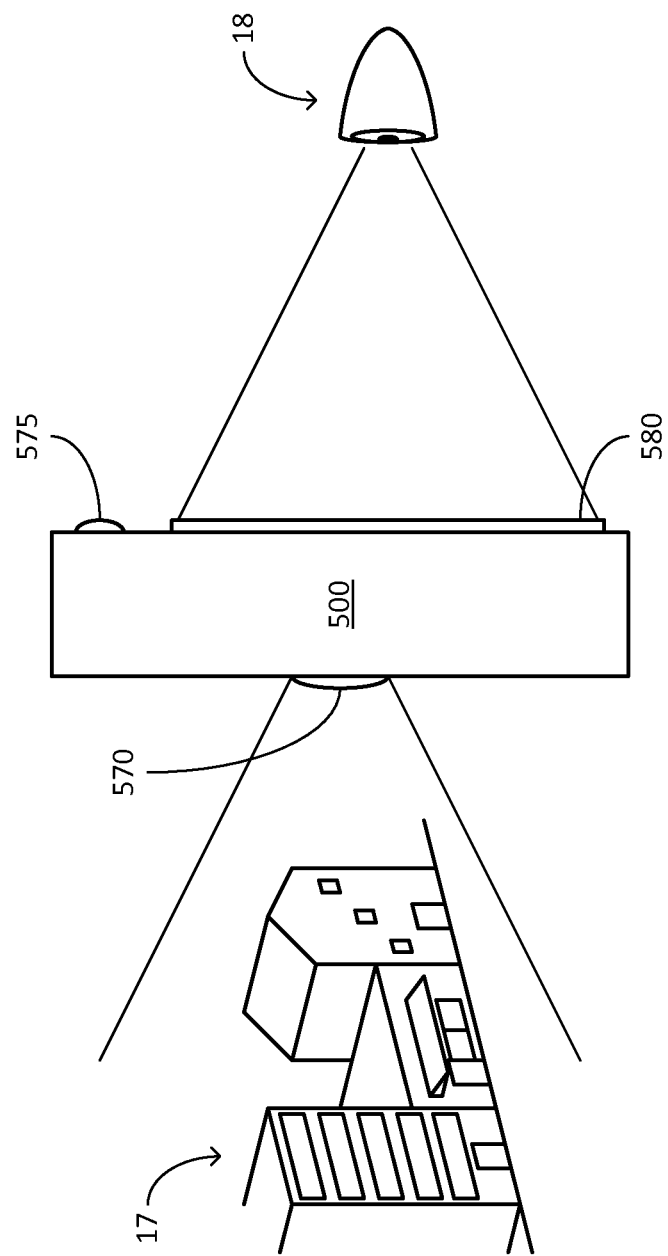
FIG. 3 illustrates operation of a viewing device according to an embodiment.

In the physical configuration depicted in FIGS. 2A-B, an operator may view objects in the surroundings of the current location "through" the viewing device 500 by positioning the viewing device 500 between one or both eyes and those objects such that the camera 570 faces towards those objects and the display 580 faces towards the eyes. FIG. 3 illustrates an example of just such positioning of the viewing device 500. Upon being so positioned, an eye 18 of an operator may look at scenery 17 in the vicinity of the current location by looking at images captured of it by the camera 570 on the display 580. In this manner, the viewing device 500 becomes a "virtual window pane" through which the operator may view the surroundings. As also depicted, the eye tracker 575 also faces towards the eye 18 when this physical configuration of the viewing device is so positioned to track movements of the eye 18.

Returning to FIG. 1, in executing the collection routine 540, the processor component 550 further operates the interface 590 (or another component able to couple the viewing device 500 to the network 999) to retrieve the location data 330 therefrom. More specifically, the processor component 550 transmits at least a portion of the location data 530 indicating the current location and/or the current orientation to the server 300 and awaits receipt of the location data 330 therefrom. The location data 330 includes information identifying items in the surroundings in the vicinity of the current location correlated to indications of direction and/or distance from the current location of each of those items. In some embodiments, the processor component 550 transmits an indication of the current location to the server 300, but not the current orientation. In such embodiments, the location data 330 may include information identifying items at locations in the surroundings that may be in any direction from the current location. In other embodiments, the processor component 550 transmits an indication of the current orientation, as well as the current location, to the server 300. The processor component 550 may also transmit an indication of the height and/or width of the field of view of the camera 570 to the server 300. In such other embodiments, the location data 330 may be limited to items in a portion of the surroundings determined by the server 300 to be likely to be within the field of view of the camera 570, given its orientation and/or the size (e.g., the height and/or width) of its field of view.

In various embodiments, the location server 300 incorporates one or more of a processor component 350, a storage 360 and an interface 390 to couple the location server 300 to the network 999. The storage 360 stores one or more of a control routine 340 and the location data 330. The control routine 340 incorporates a sequence of instructions operative on the processor component 350 in its role as a main processor component 350 of the location server 300 to implement logic to perform various functions. In executing the control routine 340, the processor component 350 operates the interface 390 receive the location data 530 from the viewing device 500 to employ in generating the location data 330 to transmit to the viewing device 500. In instances where the location data 530 includes the current location of the viewing device 500, but not the current orientation, the processor component 350 generates a version of the location data 330 that identifies items at locations in the vicinity of the current location that may be in any direction from the current location. However, in instances where the location data 530 includes the current orientation and/or size of field of view of the camera 570 in addition to the current location, the processor component 350 generates a version of the location data 330 that may be limited to identifying items in a portion of the surroundings in the vicinity of current location determined by the processor component 350 to be likely to be within the field of view of the camera 570.

Returning to the viewing device 500, the processor component 550 also operates the eye tracker 575 to track movement of at least one of the operator's eyes 18 as the operator views the images captured by the camera 570 on the display 580. The eye tracker 575 may be based on any of a variety of eye tracking techniques, including projecting one or more beams of infrared (IR) light tracked with IR cameras, and/or using an array of cameras to view angular movements of one or both eyes 18. In executing the collection routine 540, the processor component 550 at least determines what portion of the display 580 the operator is gazing at with the eyes 18.

As familiar to those skilled in the art, eyesight typically involves a combination of relatively high-speed movements of the eyes (often referred to as "saccades") between eye positions at which the eyes remain briefly fixed (often referred to as "fixations"). It is commonplace to conceive of staring or fixing a gaze on an object as looking continuously at that object without moving the eyes to look away from it. However, so-called "staring" at an object actually does not entail disrupting the occurrences of saccades. Instead, saccades continue to occur and "staring" at an object entails the occurrence of a relatively high proportion of fixations during which the eyes look at the object. In other words, "staring" at an object entails the directions at which the eyes look during fixations becoming less random and more frequently directed at that object. Thus, in determining what portion of the display an operator is gazing at, the processor component 550 may implement a form of low-pass filter in tracking eye movements to essentially filter out the saccades and/or the fixations during which the eyes (e.g., the eye 18) look in random directions.

In some embodiments, after determining what portion of the display an operator is gazing at, the processor component 550 may employ a combination of characteristics of the viewing device 500 specified in the device data 535 and indications in the location data 330 of directions of items from the current location to derive what item the operator is gazing at. As previously discussed, the device data 535 may include specifications of the field of view of the camera 570. The device data 535 may also include specifications of the display 580, thereby enabling calculations to correlate a portion of the display 580 gazed at by the operator to a specific line of sight in the field of view of the camera 570. The specific line of sight is essentially the direction in which the operator is effectively gazing through the display 580 and the camera 570. The processor component 550 may then use the location data 330 to identify one or more items of possible interest along the line sight. Stated differently, the line of sight is correlated to one or more items of possible interest using the location data 330. Still further, the processor component 550 may additionally employ the location data 330 to correlate that line of sight to one or more neighboring items that are within a specified distance of the item(s) of possible interest and/or within a specified vicinity of the line of sight (e.g., within a specified maximum offset angle from the line of sight within the field of view of the camera 570). The processor component stores at least an indication of the direction of the line of sight from the current location in which the operator gazes through viewing device 500 as the gaze data 533. In embodiments in which execution of the collection routine 540 results in the processor component 550 correlating the line of sight to at least one item of possible interest and/or one or more neighboring items, the processor component 550 may additionally store indications of the item(s) of possible interest and/or neighboring items as part of the gaze data 533.

As previously discussed, in executing the viewing routine 545, the processor component 550 recurringly retrieves images captured by the camera 570 and visually presents them on the display 580 for viewing by an operator. In executing the viewing routine 545, the processor component 550 also visually presents on the display 580 at least an indicator of an item of possible interest found to be in the line of sight from the current location correlated to the portion of the display 580 at which the operator gazes. In embodiments in which the processor component 550 was caused by the collection routine to identify and store indications in the gaze data 533 of both an item of possible interest and one or more neighboring items, the processor component 550 may be caused by the viewing routine 545 to additionally visually present one or more indicators of the neighboring items on the display 580. However, in embodiments in which the processor component 550 was cause to correlate the portion of the display 580 gazed at to a line of sight from the current location, but not to use that line of sight to identify items therealong, the processor component 550 may be caused by the viewing routine 545 to identify an item of possible interest and/or neighboring items. Stated differently, in different embodiments, the correlation of items of interest to a line of sight in which the operator gazes through the camera 570 and the display 580 may be performed through execution of the collection routine 540 or through execution of the viewing routine 545. Thus, in different embodiments, the collection routine 540 may or may not provide more support to the viewing routine 545 in employing eye tracking to identify item(s) of possible interest for which indicators may be visually presented on the display.

Figure 4A:
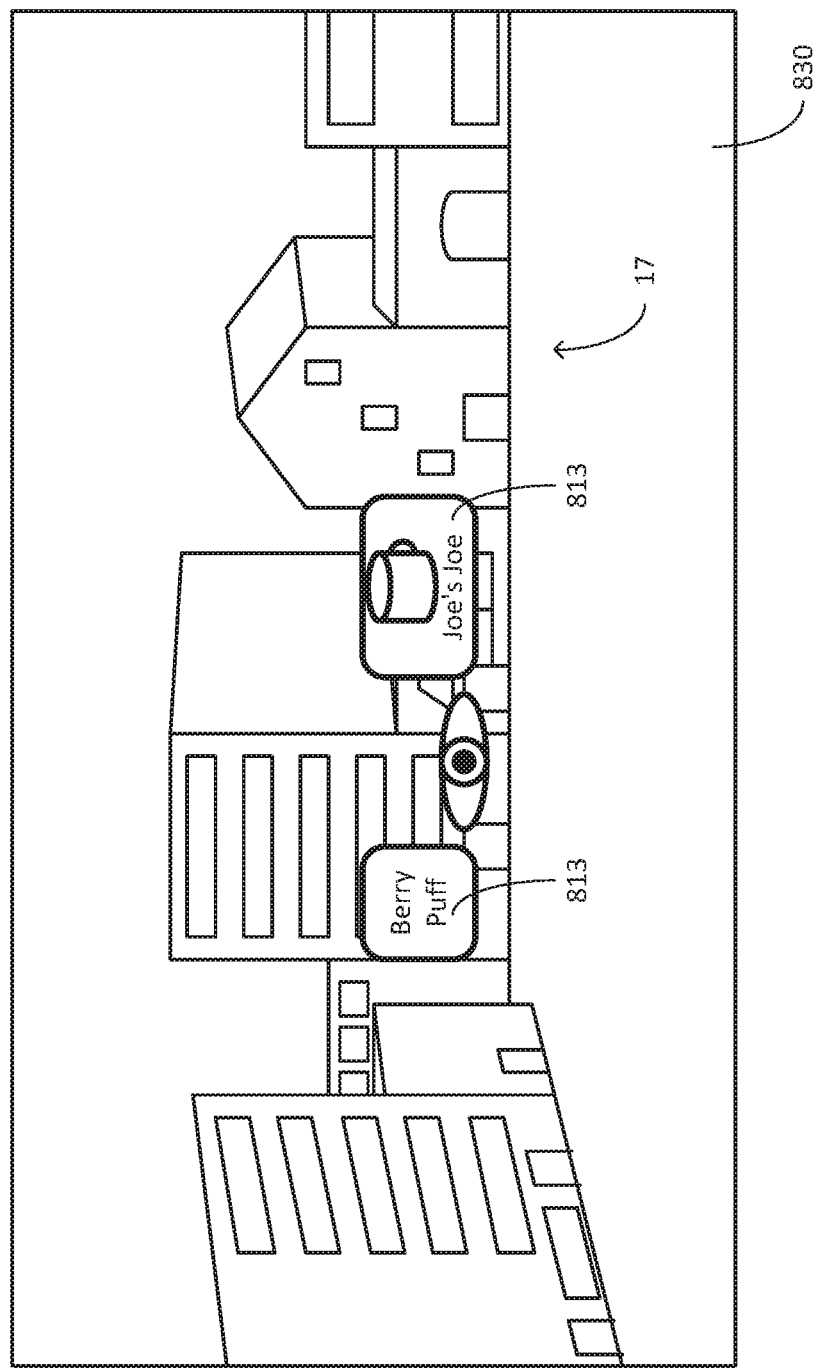
FIGS. 4A, 4B and 4C each illustrate a visual presentation of an augmented reality view according to an embodiment.
Figure 4B:
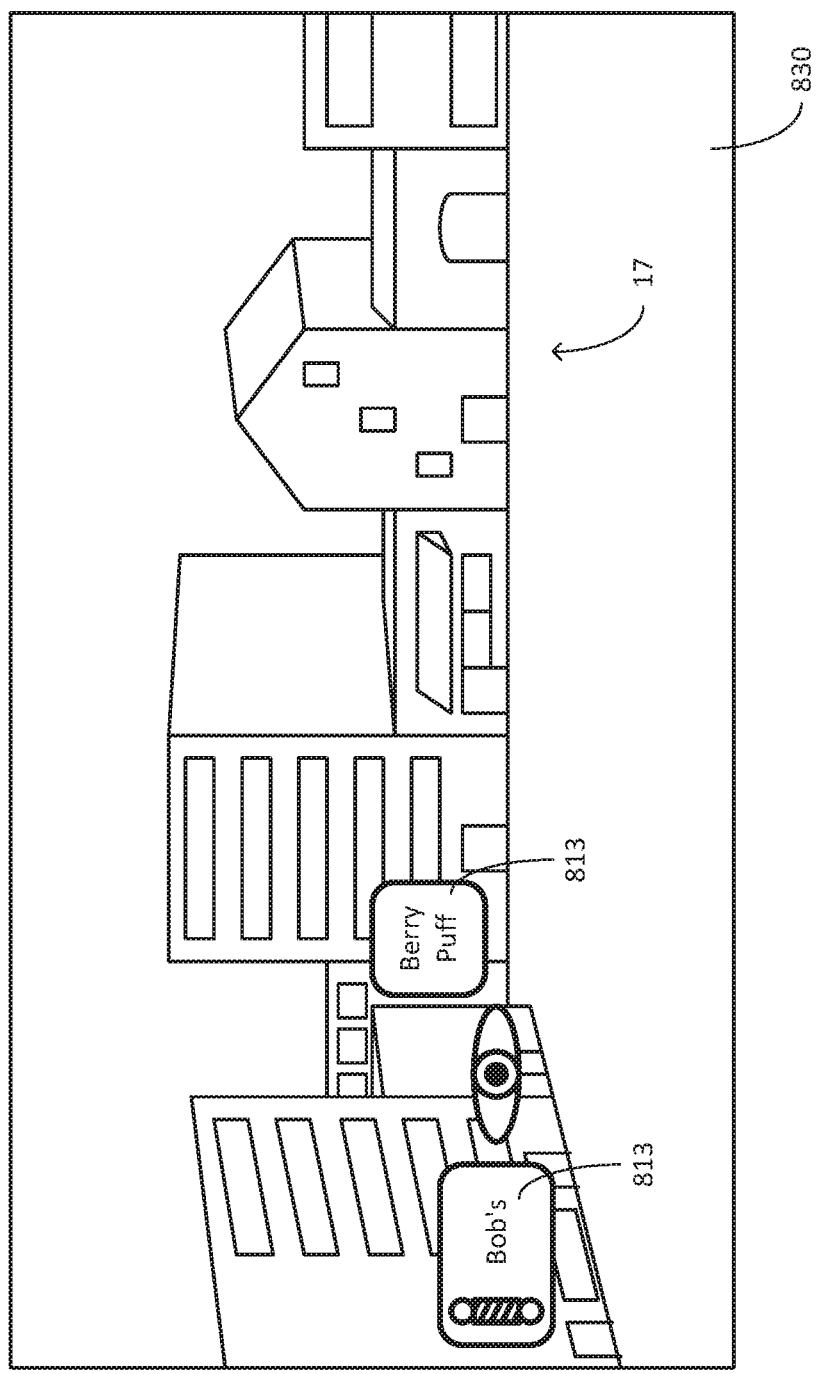
Figure 4C:
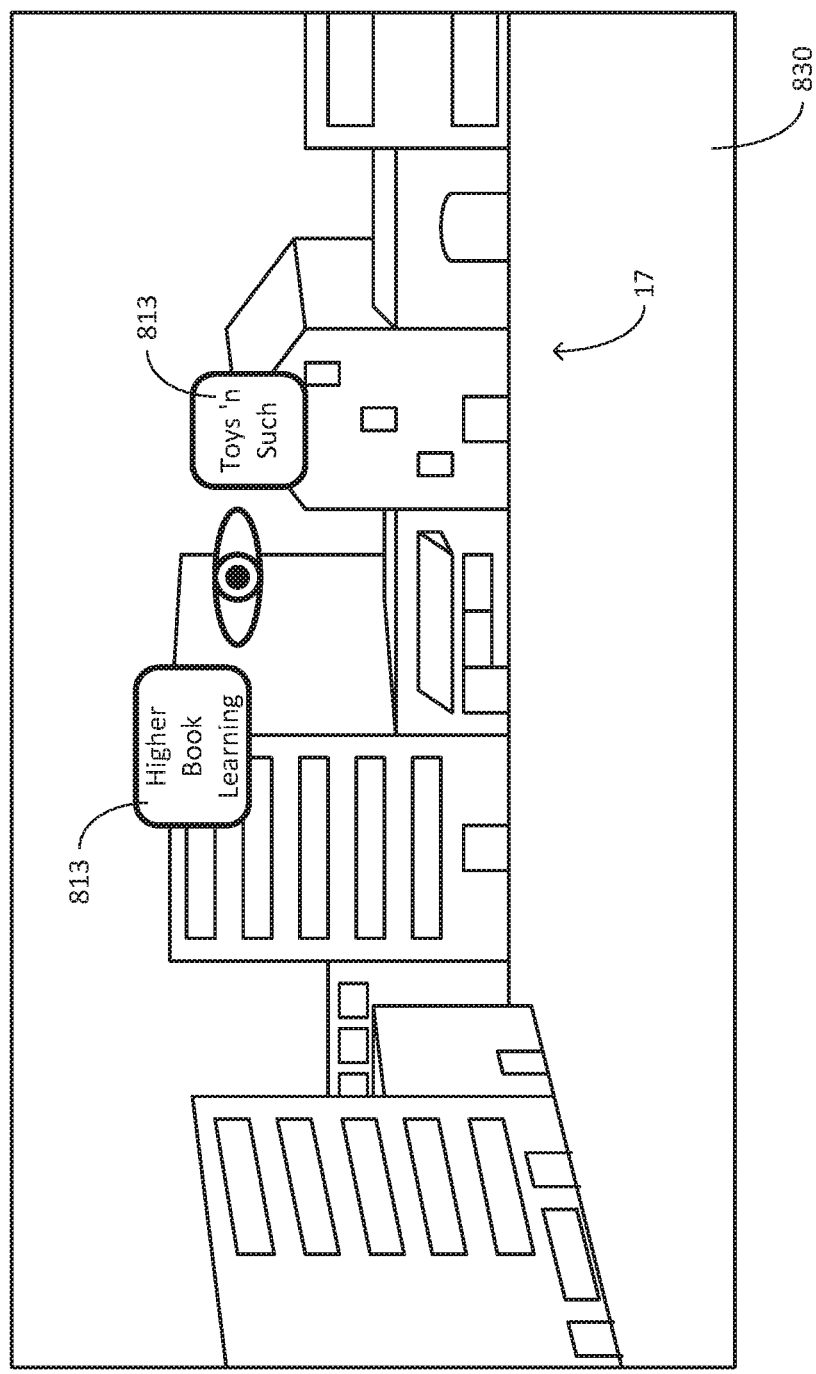

FIGS. 4A-C, together, depict an example of a visual presentation of an augmented reality view 830 on the display 580. As depicted, the scenery 17 captured by the camera 570 is visually presented on the display 580, and is overlain by indicators 813 of an item of possible interest and/or at least one neighboring item. An "eye" symbol is also depicted to do nothing more than to indicate the portion of the display 580 at which the eye 18 of the operator gazes. The eye symbol should not be taken as a graphical element that is actually visually presented on the display 580 at any time.

In FIG. 4A, the depicted position of the eye symbol indicates that the operator is gazing at a portion of the display that is more or less towards the center of the display. In some embodiments, to avoid obscuring what is visually presented at the portion of the display at which the operator gazes, the indicator 813 of the item of possible interest determined by correlation to be at that portion is visually presented on the display 580 at a location somewhat offset from that portion of the display. By way of example the indicators 813 for "Berry Puff" and "Joe's Joe" are visually presented at locations to either side of the portion of the display at which the operator gazes.

In FIG. 4B, the portion of the display 580 at which the operator gazes has changed in comparison to FIG. 4A, specifically shifting to the left and slightly downward. A new correlation of the portion of the display 580 gazed at to items indicated in the location data 330 to be in the new direction identifies one or both of "Bob's" and "Berry Puff" to be items of possible interest and/or a neighboring item. Again, the indicators 813 for each are visually presented somewhat offset from the portion of the display 580 at which the operator gazes. In FIG. 4C, the portion of the display 580 at which the operator gazes has changed again, specifically shifting back to the right and significantly upward. A new correlation of the portion of the display 580 gazed at to items indicated in the location data 330 to be in the new direction identifies one or both of "Higher Book Learning" and "Toys 'n Such" to be items of possible interest and/or a neighboring item. And again, the indicators 813 for each are visually presented somewhat offset from the portion of the display 580 at which the operator gazes. Also, as depicted in FIG. 4C, what is identified as an item of possible interest may change with a change in elevation as well as a change in orientation on a horizontal plane in some embodiments. Thus, as made clear in comparing FIGS. 4A and 4C, a change in elevation (e.g., along the height of a tall building) may result in identification of a different item of possible interest where different items are indicated in the location data 330 as positioned at different elevations.

FIG. 5 depicts another example of a visual presentation of an augmented reality view 830 on the display 580. The same scenery 17 captured by the camera 570 is visually presented on the display 580 in the same location and manner as in FIGS. 4A-C. However, the visual presentation of the scenery 17 is overlain by an alternate example of an indicator 813 that is configured to be transparent, versus the non-transparent indicators 813 of FIGS. 4A-C. As also depicted, this transparent example of an indicator 813 is positioned to overlie the portion of the display 580 at which the operator gazes, its transparency enabling the operator to still view the item at which they gaze by gazing through the indicator 813.

In various embodiments, each of the processor components 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 390 and 590 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
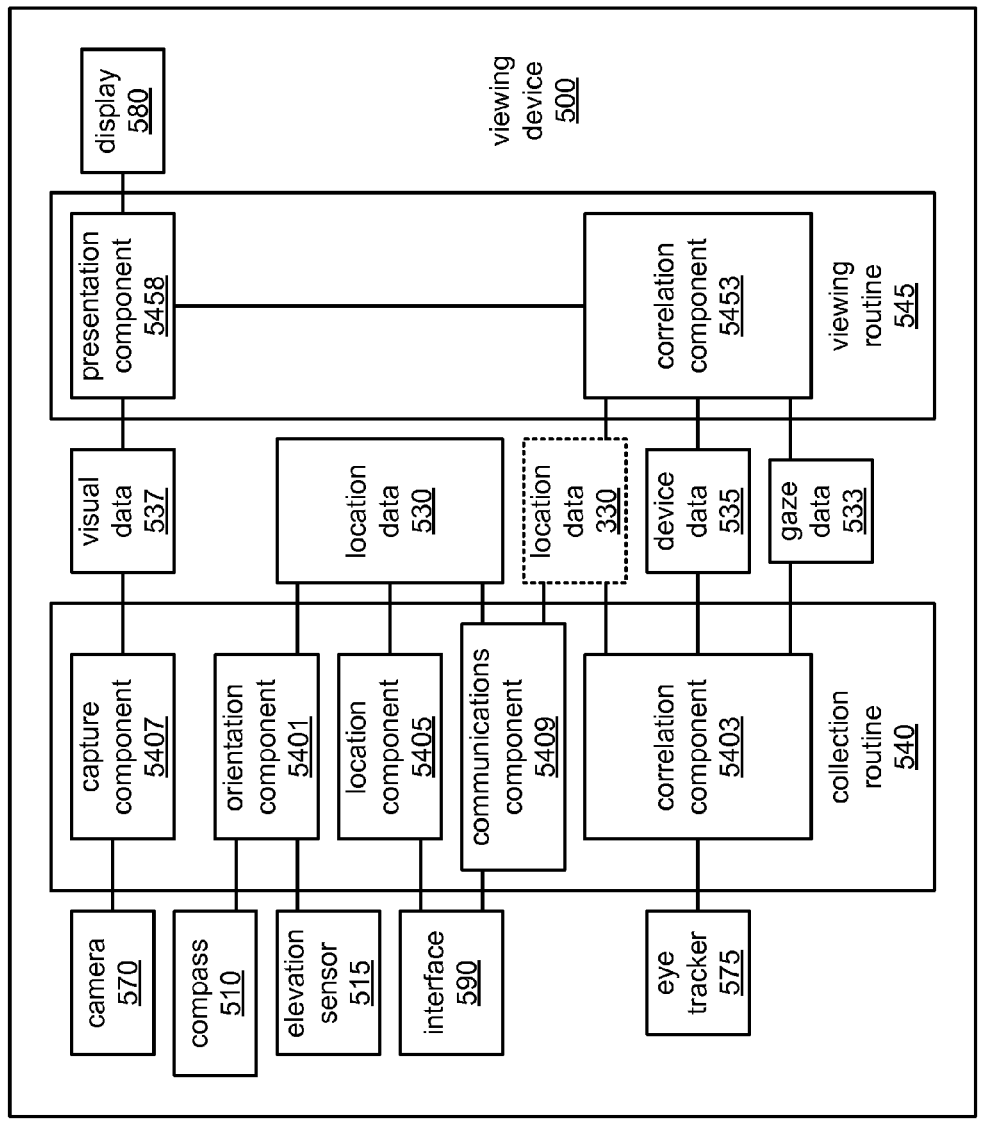
FIG. 6 illustrates a portion of an embodiment of an augmented reality system viewing system.

FIG. 6 illustrates a block diagram of a portion of an embodiment of the augmented reality viewing system 1000 of FIG. 1 in greater detail. More specifically, aspects are depicted of the operating environment of an embodiment of the viewing device 500. As recognizable to those skilled in the art, the collection routine 540 and the viewing routine 545, including the components of which each is composed, are selected to be operative on whatever type of processor or processors that are selected to implement the processor components 550.

The collection routine 540 may include a location component 5405 to operate the interface 590 to receive GPS signals and/or signals of one or more APs to determine the current location of the viewing device 500. The location component 5405 may store an indication of the current location as part of the location data 530.

The collection routine 540 may include an orientation component 5401 to operate the compass 510 and/or the elevation sensor 515 to determine the current orientation of the camera 570. The orientation component 5401 may store an indication of the current orientation as part of the location data 530.

The collection routine 540 may include a communications component 5409 to operate the interface 590 to transmit at least a portion of the location data 530 to another computing device (e.g., the location server 300). As previously discussed, the portion of the location data 530 transmitted to another computing device includes at least an indication of the current location to enable the other computing device to respond by providing the location data 330 to the viewing device 500. As also discussed, the location data 330 at least identifies one or more items in the surroundings in the vicinity of the current location, and identifies the locations of those items in the surroundings relative to the current location.

The collection routine 540 may include a capture component 5407 to operate the camera 570 to capture images of the surroundings in the vicinity of the current location of the viewing device 500 for visual presentation on the display 580. The capture component 5407 may store the captured images as part of the visual data 537.

The collection routine 540 and the viewing routine 545 may include correlation components 5403 and 5453, respectively. The correlation component 5403 operates the eye tracker 575 to at least determine what portion of the display 580 is gazed at by at least one eye 18 of an operator, and to correlate the gaze at that portion of the display 580 to a line of sight from the camera 570 along which the gaze is effectively directed. In so doing, the correlation component may retrieve specifications of the size and/or resolution of the display 580 and of the resolution and/or size of the field of view of the camera 570 from the device data 535 as inputs to calculations to determine the direction of the line of sight from the camera 570 that correlations to the portion of the display 580 gazed at.

In some embodiments, the correlation component 5403 employs the location data 330 received from another computing device to correlate the direction of the line of sight along which the gaze of the operator's eye 18 is directed to one or more items of possible interest along that line of sight. The correlation component 5403 may store an indication of the derive direction of the line of sight as part of the gaze data 533. The correlation component 5453 may retrieve the direction of the line of sight from the gaze data 533 and employ that direction and the location data 330 to identify one or more neighboring items that are within a specified distance of item(s) of possible interest and/or are within a specified distance of a point along the line of sight. Thus, the correlation components 5403 and 5453 may cooperate to identify item(s) of possible interest and/or neighboring item(s) in such embodiments. Alternatively, the correlation component 5403 may perform the identification of one or both of item(s) of possible interest or neighboring item(s) itself, and may provide indications of the identities and locations of item(s) of possible interest and/or neighboring item(s) to the viewing routine 545.

The viewing routine 545 may include a presentation component 5458 to retrieve the images captured by the camera 570 of the surroundings in the vicinity of the current location of the viewing device 500, and visually present them on the display 580. Regardless of which components identify item(s) of possible interest, the presentation component 5458 visually presents indicator(s) 813 of the item(s) of possible interest and/or neighboring item(s) on the display 580 in a manner that overlies the visual presentation of the images captured by the camera 570. As previously discussed, the indicators 813 may be visually presented in a manner in which they are positioned adjacent to, but not overlapping, the portion of the display 580 gazed at by an eye 18 of the operator. Alternatively, as previously discussed, the indicators 813 may be at least somewhat transparent such that one may overlie the portion of the display 580 that is gazed at while not significantly obscuring viewing of the scenery 17 visually presented at that portion.

Figure 7:
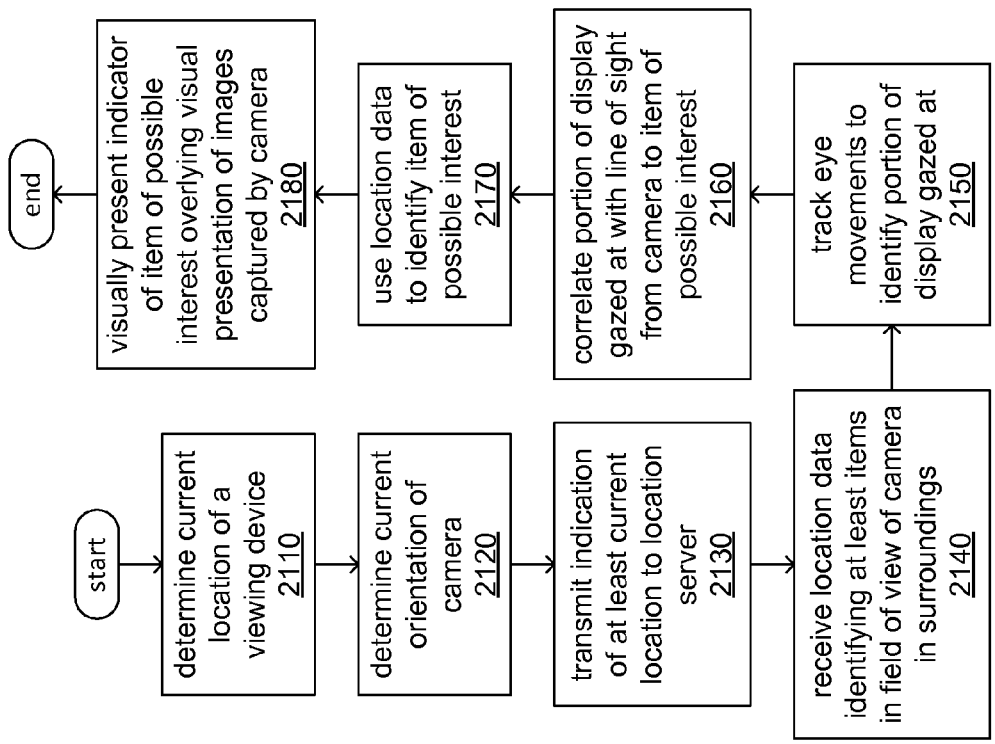
FIGS. 7-8 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least one or both of the collection routine 540 and the viewing routine 545, and/or performed by other component(s) of the viewing device 500.

At 2110, a processor component of a viewing device (e.g., the processor component 550 of the viewing device 500) determines a current location of the viewing device, and determines an orientation of the camera of the viewing device (e.g., the camera 570) relative to the current location at 2120. As previously discussed, it is envisioned that the camera is co-located in a casing with other components of viewing device such that determinations of the current location and orientation apply to the camera and the viewing device as a whole.

At 2130, an indication of at least the current location is transmitted to a location server (e.g., the location server 300), and location data identifying at least items in the field of view of the camera in the surroundings in the vicinity of the current location is received at 2140. As previously discussed, the current orientation and/or an indication of the size of the field of view of the camera may be transmitted to the location server to enable the location server to limit the information concerning items in the surroundings in the vicinity of the current location to only those in the field of view of the camera. However, it may be that only the current location is transmitted to the location server 300 such that the location data received therefrom identifies items at locations in the surroundings that may be all around the current location of the viewing device, leaving it to the viewing device to determine which ones are in the field of view.

At 2150, eye movements of at least one eye of an operator of the viewing device (e.g., the eye 18) are tracked as the operator views a display of the viewing device (e.g., the display 580) on which scenery of the surroundings captured by the camera (e.g., the scenery 17) is visually presented thereon to determine what portion of the display is gazed at by that at least one eye. At 2160, the portion of the display that is gazed at is correlated to a line of sight from the camera to a portion of the surroundings, along which may be an item of possible interest to the operator. As previously discussed, various characteristics of the display and the camera may be employed in calculations to derive the direction of the line of sight from the location of the camera and along which the operator is effectively gazing at a portion of the scenery through the combination of the camera and display in a manner in which the viewing device is used as a "virtual window pane."

At 2170, the direction of the line of sight and the location data received from the location server are used to correlate to identify one or more items of possible interest that may exist along the line of sight. As previously discussed, one or more neighboring items may also be identified.

At 2180, an indicator identifying an item of possible interest (e.g., one of the indicators 813) is visually presented on the display in a manner that overlies the visual presentation of the scenery captured by the camera. As previously discussed, the indicator may be visually presented adjacent to the portion of the display gazed at so as to not obscure the scenery visually presented at that portion, and/or the indicator may be made at least partly transparent to enable its placement to overlie the scenery at that portion while still allowing the scenery to be viewed through the indicator.

Figure 8:
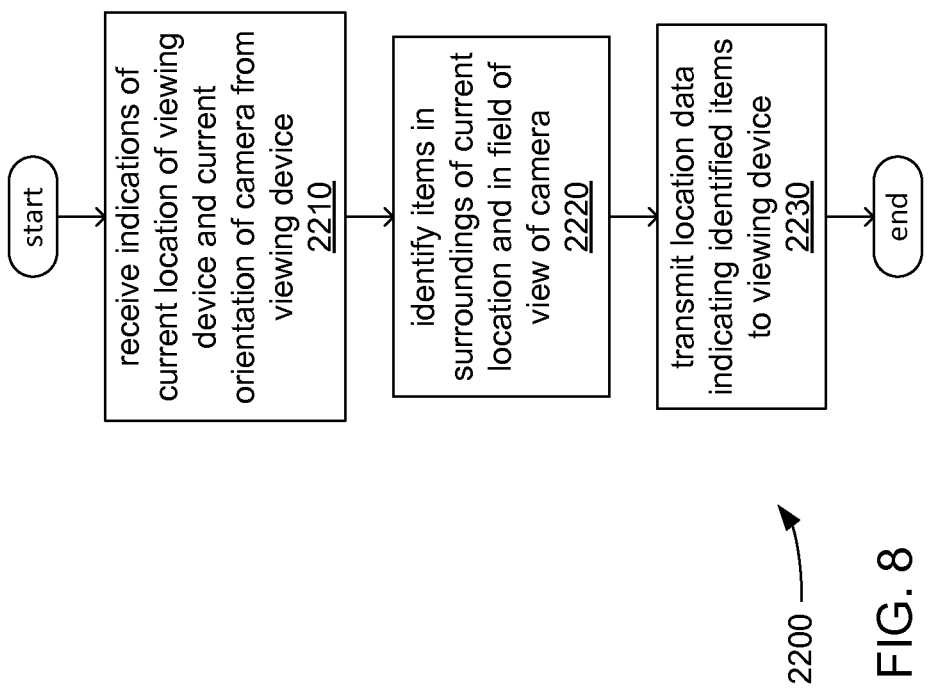

FIG. 8 illustrates one embodiment of a logic flow 2200. The logic flow 2200 may be representative of some or all of the operations executed by one or more embodiments described herein. More specifically, the logic flow 2200 may illustrate operations performed by either the processor component 350 in executing one or more executable portions of the control routine 340, and/or performed by other component(s) of the location server 300.

At 2210, a processor component of a location server (e.g., the processor component 350 of the location server 300) receives an indication from a viewing device (e.g., the viewing device 500) of the current location of the viewing device and the current orientation of its camera. As previously discussed, such a viewing device may transmit both the current location and current orientation, or may transmit the current location without transmitting the current orientation.

At 2220, items that are in the surroundings in the vicinity of the current location are identified, and that are in the field of view of the camera of the viewing device, are identified. As previously discussed, the location server may also receive an indication of the size of the field of view of the camera of the viewing device as a further input to identifying what items are in the field of view of the camera. At 2230, the location server transmits a location data indicating at least the identities of those items and their locations relative to the current location of the viewing device to the viewing device.

Figure 9:
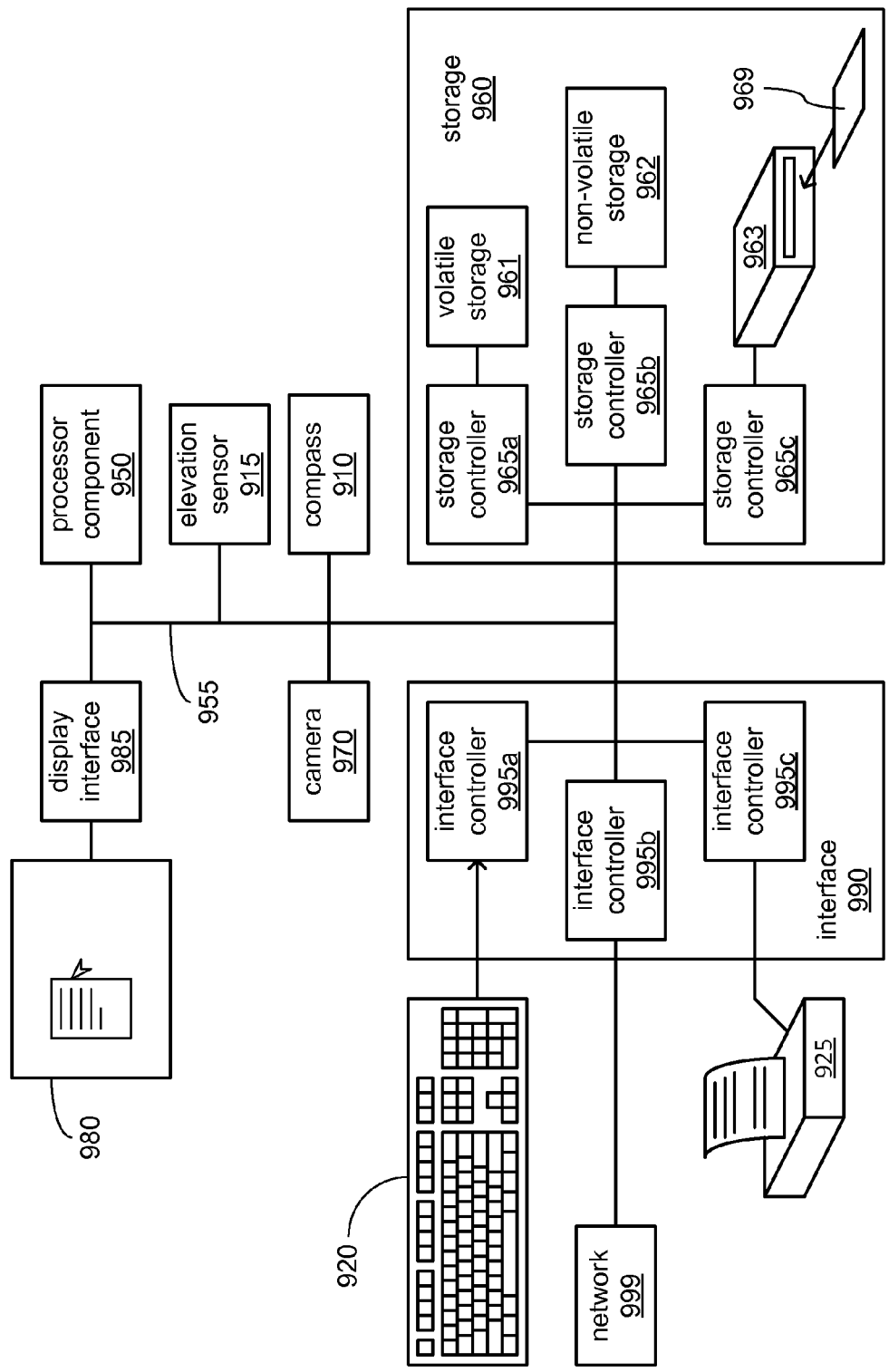
FIG. 9 illustrates a processing architecture according to an embodiment.

FIG. 9 illustrates an embodiment of a processing architecture 3000 suitable for implementing various embodiments as previously described. More specifically, the processing architecture 3000 (or variants thereof) may be implemented as part of the computing device 500. It should be noted that components of the processing architecture 3000 are given reference numbers in which the last two digits correspond to the last two digits of reference numbers of at least some of the components earlier depicted and described as part of the computing device 500. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985, a camera 970, a compass 910, an elevation sensor 915, etc.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550) may include any of a wide variety of commercially available processors, employing any of a wide variety of technologies and implemented with one or more cores physically combined in any of a number of ways.

As previously discussed, the storage 960 (corresponding to the storage 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices).

This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to a storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to one or more of the displays 180 and 380), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In some examples, an apparatus to present an augmented reality view includes a processor component; a presentation component for execution by the processor component to visually present images captured by a camera on a display, and to visually present an indicator identifying an item of possible interest in the captured images on the display overlying the visual presentation of the captured images; and a correlation component for execution by the processor component to track eye movement to determine a portion of the display gazed at by an eye, and to correlate the portion of the display to the item of possible interest.

Additionally or alternatively, the apparatus may include an interface to receive at least one of global positioning system (GPS) satellite signals or signals from a wireless network access point (AP); and a location component for execution by the processor component to employ the received signals to determine a current location.

Additionally or alternatively, the apparatus may include a communications component for execution by the processor component to transmit the current location to a computing device and to receive a location data identifying items in a vicinity of the current location and specifying locations of the items relative to the current location.

Additionally or alternatively, the apparatus may include an orientation component for execution by the processor component to determine a current orientation of the camera relative to the current location.

Additionally or alternatively, the correlation component may employ the current orientation, the portion of the display and the location data to identify the item of possible interest.

Additionally or alternatively, the apparatus may include an orientation component for execution by the processor component to determine a current orientation of the camera relative to a current location; and an interface to transmit the current location and the current orientation to a computing device and to receive a location data identifying items in a vicinity of the current location and in a field of view of the camera, the location data specifying locations of the items relative to the current location.

Additionally or alternatively, the correlation component may employ the current orientation, the portion of the display and the location data to identify the item of possible interest.

Additionally or alternatively, the correlation component may employ characteristics of the display and characteristics of the camera to determine a line of sight in the field of view of the camera that correlates to the portion of the display, and may employ the current orientation and the location data to correlate the line of sight to the item of possible interest.

Additionally or alternatively, the correlation component may correlate the portion of the display to a neighboring item located within a specified distance from the item of possible interest, and the presentation component to visually present another indicator identifying the neighboring item on the display overlying the visual presentation of the captured images.

Additionally or alternatively, the presentation component may visually present the indicator on the display offset from the portion of the display to leave the view of the captured images at the portion of the display unobscured.

Additionally or alternatively, the presentation component may visually present the indicator on the portion of the display with a degree of transparency to enable viewing of the captured images at the portion of the display through the indicator.

Additionally or alternatively, the apparatus may include at least one of an eye tracker, the camera and the display.

In some examples, an apparatus to present an augmented reality view may include a processor component; a correlation component for execution by the processor component to correlate a portion of a display gazed at by an eye to a line of sight from a camera in a field of view of the camera, and to identify an item in the line of sight as an item of possible interest; and a presentation component for execution by the processor component to visually present scenery in the field of view of the camera on the display, and to visually present an indicator identifying the item of possible interest on the display overlying the scenery.

Additionally or alternatively, the apparatus may include an interface to receive at least one of global positioning system (GPS) satellite signals or signals from a wireless network access point (AP), and a location component for execution by the processor component to employ the received signals to determine a current location.

Additionally or alternatively, the apparatus may include a communications component for execution by the processor component to transmit the current location to a computing device and to receive a location data identifying items in a vicinity of the current location and specifying locations of the items relative to the current location.

Additionally or alternatively, the apparatus may include an orientation component for execution by the processor component to determine a current orientation of the camera relative to the current location, the communications component to transmit the current orientation and an indication of a size of the field of view to the computing device, and the items identified in the location data limited to items within the field of view.

Additionally or alternatively, the correlation component may correlate the line of sight to a neighboring item located within a specified distance of a point along the line of sight, and the presentation component to visually present another indicator identifying the neighboring item on the display overlying the scenery.

In some examples, a computer-implemented method for presenting an augmented reality view may include visually presenting an indicator identifying an item of possible interest on a display overlying a visual presentation of images captured by a camera on the display, tracking eye movement to determine a portion of the display gazed at by an eye, and correlating the portion of the display to the item of possible interest in the captured images.

Additionally or alternatively, the method may include receiving at least one of global positioning system (GPS) satellite signals or signals from a wireless network access point (AP), and employing the received signals to determine a current location.

Additionally or alternatively, the method may include transmitting the current location to a computing device, and receiving a location data that identifies items in a vicinity of the current location and specifies locations of the items relative to the current location. Additionally or alternatively, the method may include determining a current orientation of the camera relative to the current location, and transmitting the current orientation and an indication of a size of a field of view to the computing device, the items identified in the location data limited to items within the field of view.

Additionally or alternatively, the method may include correlating the current orientation, the portion of the display and the location data to identify the item of possible interest.

Additionally or alternatively, the method may include correlating the portion of the display to a line of sight from the camera in a field of view of the camera to identify an item in the line of sight as an item of possible interest.

Additionally or alternatively, the method may include correlating the line of sight to a neighboring item located within a specified distance of a point along the line of sight, and visually presenting another indicator identifying the neighboring item on the display overlying the visual presentation of the captured images.

Additionally or alternatively, the method may include visually presenting the indicator on the display offset from the portion of the display to leave the visual presentation of the captured images at the portion of the display unobscured.

Additionally or alternatively, the method may include visually presenting the indicator on the portion of the display with a degree of transparency to enable viewing of the capture images visually presented at the portion of the display through the indicator.

In some examples, at least one machine-readable storage medium may include instructions that when executed by a computing device, cause the computing device to tracking eye movement to determine a portion of a display gazed at by an eye; correlating the portion of the display to an item of possible interest in images captured by a camera; and visually present an indicator identifying the item of possible interest on the display overlying a visual presentation of the captured images on the display.

Additionally or alternatively, the computing device may be caused to receive at least one of global positioning system (GPS) satellite signals or signals from a wireless network access point (AP), and employ the received signals to determine a current location.

Additionally or alternatively, the computing device may be caused to transmit the current location to a computing device, and receive a location data that identifies items in a vicinity of the current location and specifies locations of the items relative to the current location. Additionally or alternatively, the computing device may be caused to determine a current orientation of the camera relative to the current location; and transmit the current orientation and an indication of a size of a field of view to the computing device, the items identified in the location data limited to items within the field of view.

Additionally or alternatively, the computing device may be caused to correlate the current orientation, the portion of the display and the location data to identify the item of possible interest.

Additionally or alternatively, the computing device may be caused to correlate the portion of the display to a line of sight from the camera in a field of view of the camera to identify an item in the line of sight as an item of possible interest.

Additionally or alternatively, the computing device may be caused to correlate the line of sight to a neighboring item located within a specified distance of a point along the line of sight, and visually present another indicator identifying the neighboring item on the display overlying the visual presentation of the captured images.

Additionally or alternatively, the computing device may be caused to visually present the indicator on the display offset from the portion of the display to leave the visual presentation of the captured images at the portion of the display unobscured.

Additionally or alternatively, the computing device may be caused to visually present the indicator on the portion of the display with a degree of transparency to enable viewing of the captured images visually presented at the portion of the display through the indicator.

Additionally or alternatively, the computing device may be caused to

In some embodiments, at least one machine-readable storage medium may include instructions that when executed by a computing device, cause the computing device to perform any of the above.

In some embodiments, an device to compress and/or visually present video frames may include means for performing any of the above.

The invention claimed is:

1. An apparatus to present an augmented reality view comprising:
   a processor component;
   a camera operably coupled to the processor component;
   an elevation sensor to determine an elevation of the camera;
   an orientation component for execution by the processor component to determine a current orientation of the camera;
   a presentation component for execution by the processor component to visually present images captured by the camera on a display, and to visually present an indicator identifying an item of possible interest in the captured images within a field of view determined by the processor component using at least the elevation, the current orientation, and angular measurements of the camera indicating a size of the field of view, the indicator being presented on the display overlying the visual presentation of the captured images; and
   a correlation component for execution by the processor component to:
      track eye movement to determine a portion of the display gazed at by an eye of a user, and to correlate the portion of the display to the item of possible interest, and
      correlate the portion of the display to a neighboring item located within a vicinity of a line of site corresponding to the item of possible interest, the vicinity comprising an area of the display within a specified distance and at a maximum offset angle from the line of site, and the presentation component to visually present another indicator identifying the neighboring item on the display overlying the visual presentation of the captured images.

2. The apparatus of claim 1, comprising:
   an interface to receive at least one of global positioning system (GPS) satellite signals or signals from a wireless network access point (AP); and
   a location component for execution by the processor component to employ the received signals to determine a current location.

3. The apparatus of claim 2, comprising a communications component for execution by the processor component to transmit the current location to a computing device and to receive location data identifying items in the vicinity of the current location and specifying locations of the items relative to the current location.

4. The apparatus of claim 2, comprising an interface to transmit the current location and the current orientation to a computing device and to receive location data identifying items in the vicinity of the current location and in the field of view the location data specifying locations of the items relative to the current location.

5. The apparatus of claim 4, the correlation component to employ the current orientation, the portion of the display and the location data to identify the item of possible interest.

6. The apparatus of claim 1, comprising an eye tracker.

7. An apparatus to present an augmented reality view comprising:
   a processor component;
   a camera operably coupled to the processor component;
   an elevation sensor to determine an elevation of the camera;
   an orientation component for execution by the processor component to determine a current orientation of the camera;
   a correlation component for execution by the processor component to:
      correlate a portion of a display gazed at by an eye of a user to a line of sight from the camera, and to identify an item in the line of sight as an item of possible interest, and
      correlate the line of sight to a neighboring item located within a vicinity of the line of sight, the vicinity comprising an area of the display within a specified distance and at a maximum offset angle from the line of site; and
   a presentation component for execution by the processor component to visually present scenery in a field of view on the display determined by the processor component using at least the elevation, the current orientation, and angular measurements of the camera indicating a size of the field of view, and to visually present an indicator identifying the item of possible interest and another indicator identifying the neighboring item on the display overlying the scenery.

8. The apparatus of claim 7, comprising:
   an interface to receive at least one of global positioning system (GPS) satellite signals or signals from a wireless network access point (AP); and
   a location component for execution by the processor component to employ the received signals to determine a current location.

9. The apparatus of claim 8, comprising a communications component for execution by the processor component to transmit the current location to a computing device and to receive location data identifying items in the vicinity of the current location and specifying locations of the items relative to the current location.

10. A computing-implemented method for presenting an augmented reality view comprising:
   determining a current orientation and an elevation of a camera on a display;
   visually presenting an indicator identifying an item of possible interest within a field of view determined using at least the elevation, the current orientation, and angular measurements of the camera indicating a size of the field of view, the indicator being presented on the display overlying a visual presentation of images captured by the camera on the display;
   tracking eye movement to determine a portion of the display gazed at by an eye of a user;
   correlating the portion of the display to the item of possible interest in the captured images;
   correlating the portion of the display to a neighboring item located within a vicinity of a line of site corresponding to the item of possible interest, the vicinity comprising an area of the display within a specified distance and at a maximum offset angle from the line of site; and visually presenting another indicator identifying the neighboring item on the display overlying the visual presentation of the captured images.

11. The computer-implemented method of claim 10, comprising:

receiving at least one of global positioning system (GPS) satellite signals or signals from a wireless network access point (AP); and employing the received signals to determine a current location.

12. The computer-implemented method of claim 11, comprising:

transmitting the current location to a computing device; and receiving location data that identifies items in the vicinity of the current location and specifies locations of the items relative to the current location.

13. The computer-implemented method of claim 12, comprising:

transmitting the current orientation and an indication of a size of the field of view to the computing device, the items identified in the location data limited to items within the field of view.

14. The computer-implemented method of claim 13, comprising correlating the current orientation, the portion of the display and the location data to identify the item of possible interest.

15. The computer-implemented method of claim 10, comprising correlating the portion of the display to a line of sight from the camera in the field of view to identify an item in the line of sight as an item of possible interest.

16. At least one non-transitory machine-readable storage medium comprising instructions that when executed by a computing device, cause the computing device to:

determining a current orientation and an elevation of a camera on a display track eye movement to determine a portion of the display gazed at by an eye of a user;

correlate the portion of the display to an item of possible interest in images captured by a camera;

visually present an indicator identifying the item of possible interest within a field of view determined using at least the elevation, the current orientation, and angular measurements of the camera indicating a size of the field of view, the indicator being presented on the display overlying a visual presentation of the captured images on the display;

correlate the portion of the display to a line of sight from the camera in a field of view to identify an item in the line of sight as an item of possible interest; and correlate the line of sight to a neighboring item located within a vicinity of the line of site, the vicinity comprising a specified distance and a maximum offset angle from the line of sight; and visually present another indicator identifying the neighboring item on the display overlying the visual presentation of the captured images.

17. The at least one non-transitory machine-readable storage medium of claim 16, the computing device caused to:

receive at least one of global positioning system (GPS) satellite signals or signals from a wireless network access point (AP); and employ the received signals to determine a current location.

18. The at least one non-transitory machine-readable storage medium of claim 17, the computing device caused to:

transmit the current location to a computing device; and receive location data that identifies items in the vicinity of the current location and specifies locations of the items relative to the current location.

19. The at least one non-transitory machine-readable storage medium of claim 16, the computing device caused to visually present the indicator on the display offset from the portion of the display to leave the visual presentation of the captured images at the portion of the display unobscured.

20. The at least one non-transitory machine-readable storage medium of claim 16, the computing device caused to visually present the indicator on the portion of the display with a degree of transparency to enable viewing of the captured images visually presented at the portion of the display through the indicator.

* * * * *